Aug. 7, 1962   P. D. NIELSEN   3,048,703
POWER REGULATING SYSTEM
Filed April 3, 1959
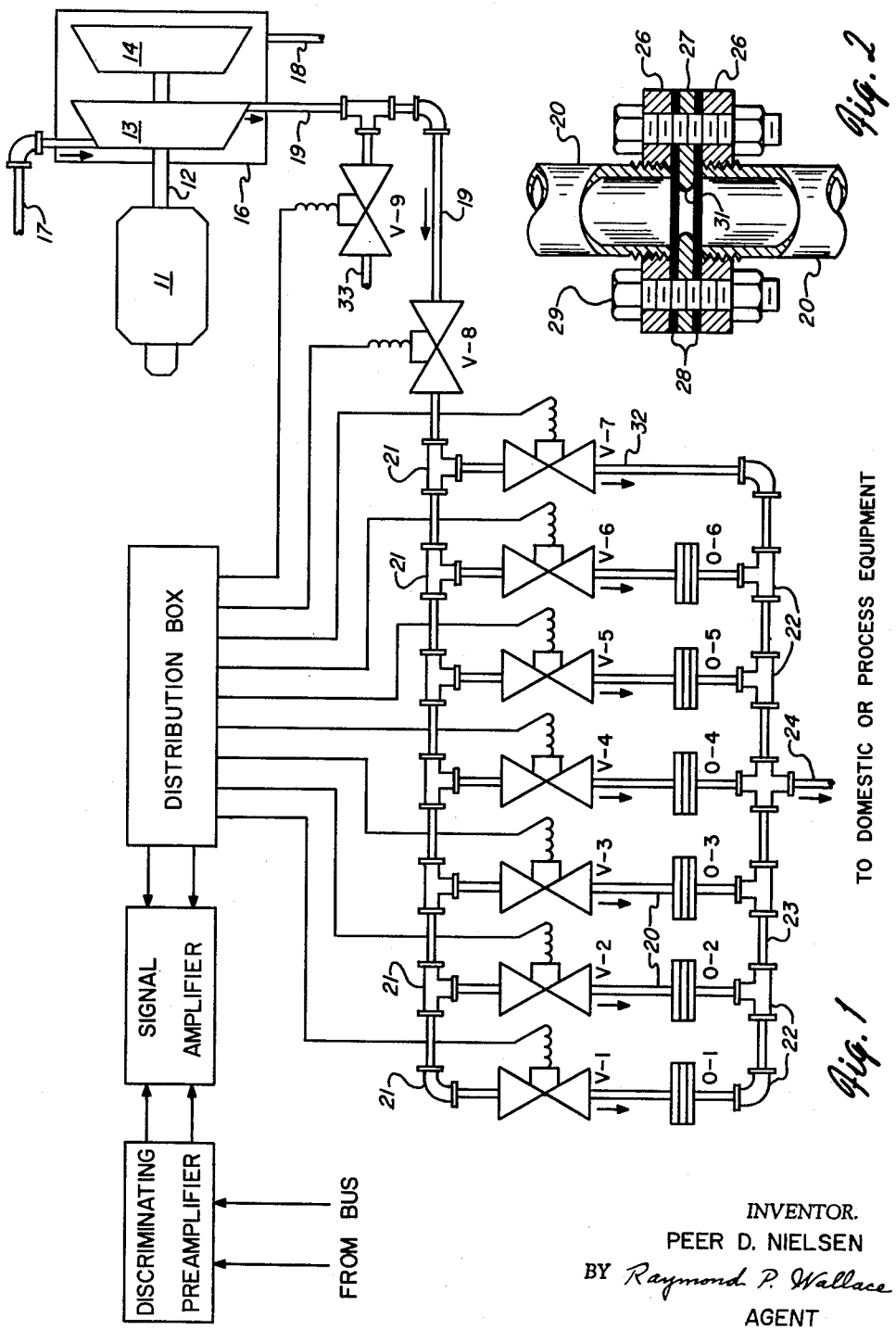
INVENTOR.
PEER D. NIELSEN
BY Raymond P. Wallace
AGENT United States Patent Office 3,048,703
Patented Aug. 7, 1962

3,048,703
POWER REGULATING SYSTEM
Peer Dudahl Nielsen, Bellefonte, Pa., assignor to Curtiss-Wright Corporation, a corporation of Delaware
Filed Apr. 3, 1959, Ser. No. 803,904
3 Claims. (Cl. 290—2)

This invention relates to means and method for regulating the flow of power, and more particularly to means and method for inhibiting power transients in a turbo-electric system.

In a turbine system of conventional type for furnishing electrical power, the voltage and frequency fluctuate with changes in the load, especially if the changes are sudden or of considerable magnitude. Such fluctuations are referred to as transients. Complete recovery of the system from a voltage or frequency transient may require a period of many minutes with the standard systems now in use, depending on the method of channeling more or less motive power to the generating equipment. In a system wherein motive power is supplied to the generator by a steam turbine, a sudden demand for electrical power causes the voltage and frequency to drop until the conventional control system can open the throttle and allow more steam through to meet the additional load. A sudden drop in electrical load causes an opposite transient that must be compensated by a decrease in throttle flow.

Modern electronic equipment, such as a radar installation for example, cannot operate efficiently with an electrical supply wherein such transients of appreciable magnitude occur. It is therefore an object of the present invention to provide an electrical power generating system having a voltage and frequency output of high constancy.

It is a further object of the invention to provide a generating system which minimizes power transients.

Another object of the present invention is to provide a power generating system allowing rapid recovery from electrical transients.

A still further object is to provide rapid control means for a fluid-driven turbine.

Yet another object of this invention is the provision of control means for fluid-driven turbines responsive to power demands.

These objects and others ancillary thereto will be better understood from a consideration of the following description in connection with the accompanying drawing, in which FIGURE 1 is a schematic view of the steam turbine, generator, steam distributing system, and electrical controls; and FIGURE 2 is an enlarged fragmentary view, partially in section, of one of the orifice plates in FIGURE 1.

Referring more particularly to FIGURE 1, there is shown an electrical generator 11 adapted to generate power for electronic apparatus, such as radar or similar installations. The generator is driven through shaft 12 by a steam turbine having stages 13 and 14 in series (shown schematically), disposed within a housing 16 in such a manner that the exhaust of stage 13 drives stage 14. It will be understood that although only two stages are shown for the sake of convenience, the invention is also adaptable to any multi-stage turbine having the stages disposed in series, and operated by steam, air, water, gas, or other fluid.

Steam intake for the turbine is provided by conduit 17 from a suitable steam generating plant (not shown). The exhaust from the last stage in the series is channeled through conduit 18 to the condenser (not shown). The exhaust of the first stage, in the embodiment shown, is not always entirely channeled to the second; instead, there is provided conduit 19 through which a certain portion of the exhaust from the first stage may be extracted for the supply of other equipment, after being channeled through the control system of the present invention. In the case of a turbine of more than two stages, the driving fluid may be extracted at any convenient point between the first and last stages.

Conduit 19 is provided with a plurality of extraction nipples 21, shown here as seven in number, although the number may be varied according to the size of the plant and the delicacy of control desired. Downstream from each of the nipples 21 is positioned a solenoid valve (shown as V-1 to V-7 inclusive, arranged in parallel) through which extracted steam passes to conduits 20 and 32 when the associated valves are open. Downstream from each of the valves except V-7 is positioned an orifice plate assembly (better shown in FIGURE 2) designated as O-1 to O-6 inclusive, through each of which will pass the steam from its associated valve when the valve is open. Steam (or other fluid) from the orifice assemblies is channeled through appropriate nipples 22 into a collecting conduit 23, from which it passes through conduit 24 to any suitable equipment, such as a heating system in the case of steam, for example, or it may be wasted.

FIGURE 2 shows one of the orifice assemblies in an enlarged view. Each of conduits 20 is interrupted by a pair of flanges 26 disposed transversely thereof and secured thereto by screw threads as shown, or by welding, brazing, or other suitable means. An orifice plate 27 having gasket means 28 positioned on each side thereof is clamped between flanges 26 by bolts 29, clamps, or other conventional fastening means. Each plate 27 is provided with a central orifice 31 preferably having smooth rounded edges and coaxial with conduit 20. The orifices 31 are of different sizes in the various orifice plates, and the number of plates in the system is such that by the selective opening of an appropriate combination of valves any amount of fluid may be passed, from the capacity of the smallest orifice operating alone up to the full capacity of conduit 19.

Conduit 32 from valve V-7 is not provided with an orifice assembly, so that if desired the entire extraction through conduit 19 may be channeled directly to the auxiliary equipment, by-passing the selective control system. In addition, there are provided solenoid valves V-8 and V-9 in conduit 19 upstream from V-7; when V-8 is closed and V-9 open, steam is not channeled to the domestic equipment, but is channeled instead through conduit 33 back to the condenser.

When the system is in operation and the electronic equipment is on standby service, valve V-8 is normally open and valves V-7 and V-9 are normally closed. Appropriate valves in the parallel series V-1 to V-6 are open to supply the domestic or other auxiliary equipment and to allow sufficient steam to drive the turbine on standby load. When more electronic equipment is switched into service, imposing a heavier electrical load on the generator and consequently requiring more power from the turbine in order to maintain constant speed, a signal from the electrical system passes through a discriminating preamplifier and a signal amplifier to a distribution box, which selects an appropriate combination of valves according to the strength of the signal, and actuates the control valves to curtail the amount of steam extracted from the exhaust of the first stage or stages of the turbine for domestic or process equipment, and thus channel more steam to the latter stage or stages, increasing the power output of the turbine.

Similarly, when the electrical load drops, the signal from the electrical system passing through the voltage signal circuits to the distribution box will actuate the control valves to allow a greater extraction of steam to balance the drop in load on the generator and the driving turbine. In each case, whether the load is increased or decreased, there will be a selective switching of appropriate control valves open or closed according to the various sizes of orifices, so that the steam available for driving the turbine will just balance the load demanded of the generator.

The operation of the control valves is practically instantaneous, so that any transients which arise in the electrical system will be minute and of very short duration, and the diminution or interruption of steam supply to the associated domestic equipment is of little consequence. In any case, the balancing of steam flow to the turbine by means of the control valves is a temporary condition which obtains only during the period required for the slow-acting throttle system to operate to provide more or less steam to the turbine.

Although the invention has been described above in a preferred embodiment, it will be apparent that it is applicable to any fluid-operated system wherein critical control is desired and wherein a portion of the fluid supply may be wasted or channeled to other service. For instance, the invention may be applied to a system wherein the turbine does not drive an electrical generator, but is used to supply motive power directly. Various changes and modifications may be made without departing from the scope of the invention. It is intended to cover all such modifications in the appended claims.

What is claimed is:

1. A power system comprising in combination an electrical generator subject to a variable electrical load, a steam-operated turbine in driving relation to said generator and having a plurality of stages in series, a plurality of valves disposed in parallel, means for extracting a portion of the operating steam between the first and last stages in said series and for channeling said extracted steam to said valves, and electrical means for selectively operating said valves in response to variation in said load.

2. A power system comprising in combination an electrical generator subject to a variable electrical load, a steam-operated turbine in driving relation to said generator and having a plurality of stages in series, a plurality of valves disposed in parallel, means for extracting a portion of the operating steam between the first and last stages in said series and for channeling said extracted steam to said valves, electrical means providing a voltage signal from said electrical load varying directly with variation in said load, and switching means responsive to said variable signal and adapted to selectively operate said valves in relation to the strength of said signal.

3. A power system comprising in combination an electrical generator subject to a variable electrical load, a steam-operated turbine in driving relation to said generator and having a plurality of stages in series, auxiliary steam-operated equipment, conduit means for extracting a portion of the operating steam from said turbine between the first and last stages in said series, a plurality of valves disposed in parallel in said conduit means, electrical means providing a voltage signal from said electrical load varying directly with variation in said load, and switching means responsive to said variable signal and adapted to selectively operate said valves in relation to the strength of said signal, whereby steam is progressively cut off from said auxiliary equipment with increase in said load and channeled to the last stage of said turbine.

References Cited in the file of this patent
UNITED STATES PATENTS

| | | |
|---|---|---|
| 824,547 | Junggren | June 26, 1906 |
| 1,064,763 | Pape | June 17, 1913 |
| 1,551,569 | Johnson | Sept. 1, 1925 |
| 2,124,339 | Schellens | July 19, 1938 |
| 2,383,219 | Schwendner | Aug. 21, 1945 |